United States Patent [19]

Akkapeddi et al.

[11] Patent Number: 4,857,603
[45] Date of Patent: Aug. 15, 1989

[54] CHAIN EXTENSION OF POLYETHYLENE TEREPHTHALATE WITH POLYACYLLACTAMS

[75] Inventors: Murali K. Akkapeddi, Morris Plains; Jay A. Gervasi, Succasunna, both of N.J.

[73] Assignee: Allied-Signal Inc., Morris Township, Morris County, N.J.

[21] Appl. No.: 161,927

[22] Filed: Feb. 29, 1988

[51] Int. Cl.$^4$ .................. C08F 20/20; C08F 20/34; C08L 67/02; C08L 77/12
[52] U.S. Cl. ........................... 525/437; 525/419
[58] Field of Search ........................... 525/437, 419

[56] References Cited

U.S. PATENT DOCUMENTS

| | | | |
|---|---|---|---|
| 3,553,157 | 1/1971 | Dijkstra et al. | 523/444 |
| 4,499,219 | 1/1985 | Buxbaum | 524/94 |
| 4,581,419 | 4/1986 | Gabbert et al. | 525/437 |
| 4,640,887 | 2/1987 | Nakamura et al. | 525/444 |
| 4,644,051 | 2/1987 | Van Geenen | 525/474 |

FOREIGN PATENT DOCUMENTS 1011892  1/1976  Japan .................. 525/437

OTHER PUBLICATIONS

T. Shima et al., *Adv. Chem Ser. 128*, 183 (1973).
H. Inata et al., *J. Appl. Polym. Sci.* 30, 3325 (1985).
H. Inata et al., *J. Appl. Polym. Sci. 32*, 4581 (1986).

*Primary Examiner*—John C. Bleutge
*Assistant Examiner*—Susan Berman
*Attorney, Agent, or Firm*—Roger H. Criss

[57] ABSTRACT

High molecular weight polyethylene terephthalate resins in which there is used a chain extending agent having the formula:

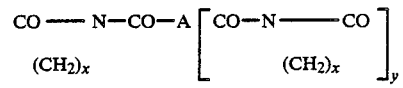

wherein A is any hydrocarbon group having the necessary number of available valences to bound itself to all of the acyl groups of the compound, Y is at least 1 and x is an integer of from 6 to 12.

Preferably, the chain extending agent is a bisacyllactam, such as terephthaloyl bislaurolactam.

The chain extending agent can be used in combination with a carboxyl reactive compound.

9 Claims, No Drawings

CHAIN EXTENSION OF POLYETHYLENE TEREPHTHALATE WITH POLYACYLLACTAMS

BACKGROUND OF THE INVENTION

1. Field of the Invention

The present invention provides improved high molecular weight, polyethylene terephthalate (PET) compositions, and methods of increasing the molecular weight of PET polymers.

2. Description of the Prior Art

Polyethylene terephthalate (PET) is one of the most commercially important resins used for fibers, film and plastics applications. It is usually prepared by the polycondensation of ethylene glycol with dimethyl terephthalate or terephthalic acid at elevated temperatures with the removal of methanol (or water) and ethylene glycol as by-products. The intrinsic viscosity of the polymer obtained in such a melt condensation process normally is between 0.5–0.7 which is adequate for many applications. However, in many other applications in which high strength and toughness are required in the final fabricated product, e.g., in industrial yarns, blow molded, extruded or thermoformed products, high molecular weight PET with an intrinsic viscosity above 0.9 is desired. In the normal PET polymerization reactors it is very difficult to obtain high molecular weight polymer since the reaction rate becomes slow and diffusion controlled in the final stages. Prolonged heating causes the degradation of terminal hydroxyl groups leading to the formation of undesired carboxyl end groups which promote further degradation (hydrolytic or thermal) of the polymer.

To overcome these limitations, post-polymerization of low molecular weight PET in the solid state is currently practiced to some extent. However, the solid state polymerization process is slow and requires special equipment for large scale operation.

An alternative approach would be to chain extend PET in the melt-phase with suitable "chain extenders" which would react readily with the hydroxyl and/or carboxyl end groups of the polymer, such coupling reactions leading to increased molecular weights.

In principle, these chain extenders must preferably be bifunctional, thermally stable and capable of reacting quickly with the polyester chain ends, via the nearly irreversible addition or ring-opening type reactions which do not evolve small molecule by-products.

Although compounds such as diphenyl carbonate and diphenyl oxalate were proposed as chain extenders for PET by T. Shima. T. Urasaki and I. Oka. in *Adv. Chem. Ser.* 128. 183 (1973), these reagents form high boiling by-products such as phenol and ethylene carbonate which are difficult to remove.

Some addition-type chain extending agents such as bisepoxides dianhydrides and diisocyanates have also been disclosed in U.S. Pat. No. 3,553,157 to Dijkstra et al., but these reagents lead to the formation of some undesirable branching and/or thermally unstable linkages in the polymer.

For example, epoxides generate hydroxyl groups which can participate in chain branching/gelation reactions, while isocyanates can lead to the thermally unstable urethane linkages.

Other addition-type chain extenders that have been reported recently for the chain extension of PET include bisoxazolines and bis (1,3 oxazine-4-ones), as reported by H Inata and S. Matsumura in the *J. Appl. Polym. Sci.,* volumes 30 3325 1985) and 32, 4581 (986), respectively. These reagents appear to require long reaction times in a reactor and their efficiency in an extruder process, which is an economically preferred process, is unknown.

In addition, stabilized polyester molding compositions are disclosed in U.S. Pat. No. 4,499,219 to Buxbaum et al. which include a polyepoxide as a first stabilizer and a second stabilizer which includes certain bisoxazolines and/or certain dicarboxylic acid imides and amides. Such Patent states that when processing the compositions, only a slight fall in viscosity or none at all is observed.

It would be desirable to provide polyethylene terephthalate resins which exhibit an increased viscosity without the need for post-polymerization techniques and without forming unwanted by-products.

SUMMARY OF THE INVENTION

In accordance with this invention, there is provided a high molecular weight polyethylene terephthalate resin consisting essentially of polyethylene terephthalate having incorporated in the polymer chain a chain extending linkage derived from compounds having the formula:

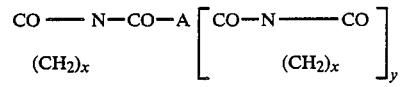

wherein A is any hydrocarbon group having the necessary number of available valences to bound itself to all of the acyl groups of the compound, y is at least 1 and x is an integer of from 6 to 12.

It has been surprisingly found that polyacyllactams, particularly bisacyllactams of 6 to 12 carbon atoms, are effective chain extending agents for polyethylene terephthalate resins, without producing undesirable by-products. The resulting resins exhibit high viscosities and excellent physical properties.

Preferably, the chain extending linkage is derived from compounds having the formula:

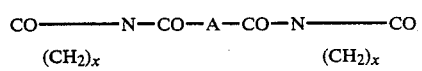

wherein A is selected from the group consisting of arylenes, alkylenes, aralkylenes and polyvinyls, and x is an integer of from 6 to 12.

The most preferred chain extending agent is terephthaloyl bislaurolactam. It has been surprisingly found that such compound exhibits significantly improved reactivity as compared with terephthaloyl biscaprolactam.

Also in accordance with this invention, there is provided a high molecular weight polyethylene terephthalate resin consisting essentially of the reaction product of a polyethylene terephthalate polymer, a polyacyllactam chain extending agent of the above formula, and a carboxyl reactive compound.

It has been surprisingly found that when a carboxyl reactive compound is used together with the polyacyllactams of this invention, a higher molecular weight polyethylene terephthalate polymer is produced. In contrast, when the carboxyl reactive agent is used without the chain extending agent of this invention, no improvement or only marginal improvements in molecular weight results.

In further accordance with this invention, there is provided a method of increasing the molecular weight of a polyethylene terephthalate polymer comprising contacting the polymer with a chain extending agent consisting essentially of a compound having the formula:

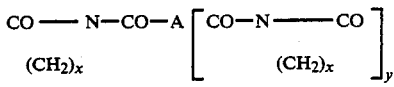

wherein A is any hydrocarbon group having the necessary number of available valences to bound itself to all of the acyl groups of the compound, y is at least 1 and x is an integer of from 6 to 12.

In addition, in accordance with this invention there is provided a method of increasing the molecular weight of a polyethylene terephthalate polymer comprising contacting the polymer with a chain extending agent consisting essentially of a compound having the formula:

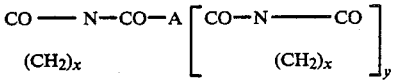

wherein A is any hydrocarbon group having the necessary number of available valences to bound itself to all of the acyl groups of the compound, y is at least 1 and x is an integer of from 6 to 12, and with a carboxyl reactive compound.

DESCRIPTION OF THE PREFERRED EMBODIMENTS

It has been discovered that polyacyllactams. preferably bisacyllactams of 6 to 12 carbon atoms, and particularly bisacyllaurolactams, are effective hydroxyl reactive chain extending agents for polyethylene terephthalate. In the normal polyester polycondensation process the hydroxyl end groups are more preponderant. Such hydroxyl reactive chain extending reagents, when used in combination with known carboxyl reactive reagents such as bisoxazolines or carbodiimides, are even more effective in yielding even a higher molecular weight polymer, due to the synergistic action of the two materials.

The resins of the present invention are high molecular weight polyethylene terephthalate (PET) polymers having incorporated in the polymer a chain extending linkage derived from compounds having the formula:

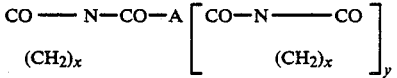

wherein A is any hydrocarbon group having the necessary number of available valences to bound itself to all of the acyl groups of the compound, y is at least 1 and x is an integer of from 6 to 12. Preferably, y is an integer from 1 to 3.

Preferably, the chain extending linkage is derived from compounds having the formula:

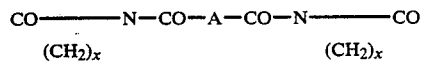

wherein A is selected from the group consisting of arylenes, alkylenes, aralkylenes and polyvinyls, and x is an integer from 6 to 12, preferably, the alkylenes contain from 1 to 12 carbon atoms. Most preferably, x is 11. Examples of arylenes are p-phenylene, m-phenylene, etc. Examples of alkylenes are ethylene, butylene, octylene, etc. Examples of aralkylenes are p-meta-xylylene, etc.

Particularly preferred for use herein are terephthaloyl bislaurolactam, terephthaloyl biscapryllactam, trimesyltrislauolactam, poly(acryloyllaurolactam) and the like.

Terephthaloyl bislaurolactam (TBLL) is most preferred for use herein, as it demonstrates unexpected, significantly high selectivity and reactivity. Although not to be bound by any theory, it is believed that this selectivity and reactivity may be attributed to the ability of TBLL to undergo essentially a ring-opening reaction with the hydroxyl chain ends of the PET, as opposed to an otherwise reversible condensation reaction, such as that which might occur with a compound such as terephthaloyl biscaprolactam involving the elimination of caprolactam as a by-product. The following schematic demonstrates this:

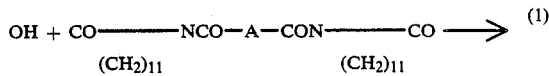

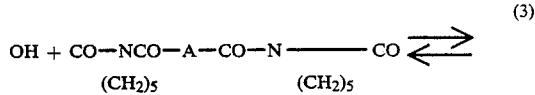

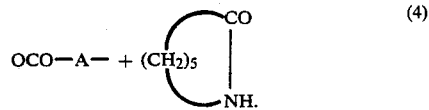

As can be seen from equations 1 and 2, the TBLL under a ring opening reaction. In contrast, the corresponding biscaprolactam undergoes an elimination reaction (equations 3 and 4), which is reversible.

The PET polymers in the resins of the invention are those that will react with the above-mentioned chain extending agents to result in a higher molecular weight polymer. As exemplified, this is most frequently through an hydroxyl terminal group. The PET polymer for use with the present invention preferably has an intrinsic viscosity in the range of between about 0.1 and about 0.8 dlg$^{-1}$, with a more preferred intrinsic viscosity range of between about 0.5 and about 0.7 dlg$^{-1}$. Intrinsic viscosity is obtained by extrapolation viscosity values to zero concentration of solutions of PET in 60 to 40 weight/weight ratio of phenol and tetra- chloroethane. The measurements are normalized to 2° C. The PET polymer melts between about 250° C. and 275° C. The poly(ethylene terephthalate) can contain minor amounts, e.g., up to about 5%, of other components such as 1,4-cyclohexanedimethanol, butylenediol, neopentylendiol, diethylene glycol, or glutaric acid, and combinations thereof.

In one embodiment of this invention the chain extending agents of the invention are used in combination with a carboxyl reacting compound stabilizer to ensure that any simultaneous chain degradation does not take place due to catalytic effect of the carboxylic acid groups.

Preferred carboxyl reacting stabilizers are 1,3-oxazolines, such as 2,2'-m-phenylene-bis(1,3 oxazoline), 2,2'-bis(1,3 oxazoline), etc.; carbodiimides such as poly(2,4,6-tri-isopropyl-1,3-phenylene carbodiimide), and the like. Suitable weight ratios of carboxyl stabilizers to chain extending agents generally range from about 0.2:1 to about 1:1, preferably about 0.5:1 to 0.8:1.

The carboxyl reacting stabilizers may be reacted at any time with the polymers, but are preferably added in conjunction with the chain extending agents.

The high molecular weight polyethylene terephthalate resins formed by this invention generally have intrinsic viscosities preferably above 0.8 and more preferably in the range of about 0.8 to about 1.5.

The resins of the invention may be formed into compositions which contain one or more conventional additives such as stabilizers and inhibitors of oxidative, thermal, and ultraviolet light degradation, lubricants and mold release agents, colorants, including dyes and pigments, flame-retardants, fibrous and particulate fillers and reinforcements, plasticizers, nucleating agents, and the like. These additives may be incorporated in a known manner.

In the method of the present invention, a reaction product is formed by contacting the PET polymer with the chain extending agent, using such techniques as heating in a solvent medium, melt-blending, and the like. It has been discovered that chain extension of the PET takes place within the residence times normally encountered in an extrusion operation. Thus, the chain extension techniques as described herein are particularly suitable for extruder processing and the like.

In the preferred embodiment, the PET polymer is reacted with the chain extending agent using conventional melt-blending techniques. It is preferable that the reaction be performed in a closed mixing device, such as an extruder, for a time sufficient to allow a reaction to occur between the chain extending agent and the polyester to allow an increase in viscosity as evidenced by an increase in melt pressure. Temperatures that may be utilized vary according to the properties of the components employed, but are typically above the melting temperature of the polymer components, but below temperatures that lead to degradation of the components. Typical temperatures range trom about 230° C. to about 300° C.; particularly preferred, however, are temperatures of about 260° C. to about 290° C. Preferably, the carboxyl reactive compound is added in the extruder together with the chain extending agent.

The amount of chain extending useful within the context of the reaction may vary widely depending on the PET and the particular chain extending agent utilized, as well as the desired characteristics of the resulting composition. Preferred amounts of chain extending agent range from about 0.25% to about 8.0% by weight of the polyester component, more preferably about 1.0% to 5.0%, and most preferably about 1.5% to 3.0%.

The high molecular weight PET resins of the invention exhibit improved properties such as elongation, toughness, impact strength, and the like. The resins are thus especially suited to be made into a wide range of useful articles by conventional molding methods employed in the fabrication of thermoplastic articles, i.e., as molded parts, extruded shapes, e.g., tubing, films, sheets, fibers and oriented fibers, laminates and wire coating. "Molding" as used herein means forming an article by deforming the resin in the heated plastic state.

The following non-limiting examples are given to further describe the invention.

EXAMPLE 1

Commercial polyethylene terephthalate pellets of 0.7 I.V. and carboxyl value of 0.03 meq g$^{-1}$ were dried in vacuum at 120° C. overnight and then intimately mixed with 2 parts per hundred parts of resin (phr) of terephthaloyl bislaurolactam using 1 phr of dioctyladipate as a coating medium. This mixture was fed into the hopper of a one inch (2.54 cm), single screw Wayne extruder equipped With 24/1 (L/D) mixing screw and operated at 40 rpm and a throughput rate of about 6 lbs/hr. The temperature of the three heating zones were set at about 530° F (277° C.). The PET extrudate was cooled. Pelletized, and dried. The PET after extrusion was found to have an intrinsic viscosity of 0.87 dlg$^{-1}$ (in phenol-tetrachloroethane 60/40 weight/weight mixture), corresponding to a number average molecular weight $M_n$ of 41,258 as calculated from the relationship:

$$M_n = 4.993 \times 10^4 [I.V.]^{1.37}.$$

Terephthaloyl bislaurolactam (TBLL) was prepared as follows:

To a refluxing solution of 59.3 parts of laurolactam in 100 parts of cyclohexane and 67 parts of pyridine, a solution of terephthaloyl chloride (30.5 parts in 75 ml cyclohexane) was added dropwise with stirring. After an additional period of 3½ hours of stirring, 85 parts of the solvent were off and the reaction mixture remaining was poured into excess of ice water. The precipitated product was filtered, washed with water and aqueous methanol and then dried under vacuum. The product recovered in 91% yield has a melting point of 114°–120° C.

EXAMPLE 2

The PET extrusion experiment of Example 1 was repeated with 5 phr of TBLL. The I.V. of the PET extrudate was 0.84 dlg$^{-1}$ corresponding to $M_n$ of 39,320.

CONTROL EXAMPLE 1

Several batches of commercial polyethylene terephthalate with an average I.V. of 0.7±0.01 and carboxyl value of 0.03 meq g$^{-1}$ were extruded as controls with no additives present in the same extruder and same process conditions as described in Example 1. The I.V. of PET extrudate was 0.67±0.01 and the carboxyl value of 0.034 meq g$^{-1}$ indicating some chain degradation and resultant decrease in molecular weight.

COMPARATIVE EXAMPLE 1

Dry pellets of 0.7 I.V. were intimately mix with 1.2 phr 2,2'-m-phenylene bis(1,3 oxazoline) (MBO) and the mixture was extruded on 1 inch (2.54 cm) single screw Wayne extruder under conditions similar to Example 1. The I. V. of the PET after this extrusion was 0 72 and the carboxyl value has 0.004 meq g$^{-1}$. This experiment indicates that MBO is a carboxyl reactive reagent but not an effective chain extender.

COMPARATIVE EXAMPLE 2

Dry PET pellets of I.V.=0.7 were intimately mixed with 1.5 phr of Stabaxol p-100, an oligomeric polycarbodiimide (from Rhein Chemie), a reagent presumed to be reactive with the carboxyl end groups of PET. This compound is understood to be poly(2,4,6-triisopropyl-1,3 phenylene carbodiimide) (PCDI). The mixture was extruded under the conditions similar to Example 1. The PET extrudate was found to have an I.V. of 0.73 corresponding to $M_n$=32.440, and a carboxyl value of 0.017. This experiment indicates that PCDI is reactive with PET carboxyls but is not effective in increasing its molecular weight.

COMPARATIVE EXAMPLE 3

(a) Dry PET Pellets of 0.7 I.V. were mixed with 2 phr of terephthaloyl biscaprolactam and extruded in the 1 inch Wayne extruder under conditions similar to Example 1. The I.V. of the PET extrudate was 0.68 corresponding to a molecular weight of 29,460.

(b) The experiment was repeated with 5 phr of terephthaloyl biscaprolactam as above. The PET extrudate so obtained had an I.V. of 0.48 corresponding to $M_n$ of 18,230.

The terephthaloyl biscaprolactam was prepared in a manner similar to that described above for TBLL. Its melting point was about 200° C.

These two experiments indicate that terephthaloyl biscaprolactam does not chain extend PET. It does not prevent the chain degradation of PET and may even cause further degradation at high concentrations.

EXAMPLE 3

This experiment employed another single screw extruder (1" Killion) with a longer (L/D=30/1) mixing screw. Commercial polyethylene terephthalate of 0.79 I. V. and carboxyl value of 0.03 meq $g^{-1}$ was mixed with 1.9 phr of TBLL and extruded on the Killion extruder. Zones 1-4 of the extruder barrel were set at 450° F. (232° C.), 550° F. (288° C.). 540° F. (282° C.) and 540° F. (282° C.), respectively and the die temperature at 540° F. (282° C.). The screw speed was 40 rpm and the amperage was 7.5. The PET extrudate was cooled. Pelletized and dried. The I.V. of the PET after extrusion was 1.01 corresponding to $M_n$ of 50.615 and a carboxyl value of 0.047 meq $q^{-1}$ A control PET extrusion (control Example 2, with no additive, under similar conditions) gave an I.V. of 0.73 and a carboxyl value of 0.033 meq $g^{-1}$.

Thus, TBLL is effective in increasing the molecular weight through an apparent chain extension reaction involving hydroxyl end groups, in spite of the fact that the carboxyl value increased instead of decreasing, due to a concurrent chain degradation.

The following examples illustrate the effectiveness of TBLL as chain extender in the presence of carboxyl stabilizers.

EXAMPLE 4

PET pellets of I.V.=0.79 were intimately mixed with 1.9 phr of TBLL and 1.2% MBO and then extruded as described in Example 3. The PET extrudate showed an increase in molecular weight (I.V.=1.17, $M_n$=61,910) while simultaneously reducing carboxyl value to 0.015 meq $g^{-1}$.

EXAMPLE 5

PET Pellets of I.V.=0.79 were mixed with 1.9 phr of TBLL and 1.5 phr of PCDI and extruded as described in Example 3. The PET extrudate showed an I.V. of 1.33 corresponding to $M_n$=73,800 and a carboxyl value of 0.018 meq $g^{-1}$.

The results are summarized in Table 1.

TABLE 1

| Example | PET | Additive | PET Properties after Extrusion | | |
|---|---|---|---|---|---|
| | | | I.V. dlg$^{-1}$ | $M_n$ | Carboxyl meq · g$^{-1}$ |
| Control | I | None | 0.67 | 28,885 | 0.034 |
| Comparative Example 1 | I | 1.2% MBO | 0.72 | 31,830 | 0.004 |
| Comparative Example 2 | I | 1.5% PCDI | 0.73 | 32,440 | 0.017 |
| Comparative Example 3 (a) | I | 2% Terephthaloyl biscaprolactam | 0.68 | 29,460 | |
| Comparative Example 3(b) | I | 5% Terephthaloyl biscaprolactam | 0.48 | 18,230 | |
| Example 1 | I | 2% TBLL | 0.87 | 41,258 | |
| Example 2 | I | 5% TBLL | 0.84 | 39,320 | |
| Control Ex. 2 | I | None | 0.73 | 32,440 | 0.033 |
| Example 3 | II | 1.9% TBLL | 1.01 | 50,615 | 0.047 |
| Example 4 | II | 1.9% TBLL + 1.2% MBO | 1.17 | 61,910 | 0.015 |
| Example 5 | II | 1.9% TBLL + 1.5% PCDI | 1.33 | 73,800 | 0.018 |

Note: The I.V. of PET-I and PET-II before extrusion was 0.7 and 0.79, respectively.

It can be seen that the present invention provides high molecular weight polyethylene terephthalate resins which have increased viscosity, and which can be prepared without post-polymerization operations and without forming unwanted by-products. The resins exhibit improved physical and other desirable properties.

The molecular weight of the PET resins can be increased by processing the resins in an extruder, together with the chain extending agent, and optionally the carboxyl reactive compound. Thus, high molecular weight PET resins can be obtained in an economical manner.

What is claimed is:

1. A high molecular weight polyethylene terephthalate resin consisting essentially of a resin consisting of repeating units of ethylene terephthalate and optionally up to five percent of components selected from the group consisting of 1,4-cyclohexanedimethanol, butylenediol, neopentylenediol, diethylene glycol, glutaric acid and combinations thereof, and having incorporated in the polymer chain a chain extending linkage derived from terephthaloyl bislaurolactam.

2. The high molecular weight polyethylene terephthalate resin of claim 1, wherein said resin consists of repeating units of ethylene terephthalate.

3. The high molecular weight polyethylene terephthalate resin of claim 2, wherein said chain extending linkage is present in an amount of about 0.25 to about 8 percent based on the weight of the polyethylene terephthalate.

4. The high molecular weight polyethylene terephthalate resin of claim 3, wherein said chain extending agent is present in an amount of about 1 to about 5 percent by weight based on the weight of the polyethylene terephthalate.

5. A method of increasing the molecular weight of a polyethylene terephthalate polymer consisting of repeating units of ethylene terephthalate and optionally up to five percent of components selected from the group consisting of 1,4-cyclohexanedimethanol, butylenediol, neopentylenediol, diethylene glycol, glutaric acid and combinations thereof, comprising contacting said polymer with a chain extending agent consisting essentially of terephthaloyl bislaurolactam.

6. The method of claim 5, wherein said polymer consists of repeating units of ethylene terephthalate.

7. The method of claim 6, wherein said contacting is carried out in an extruder.

8. The method of claim 7, wherein said chain extending agent is present in an amount of about 0.25 to about 8 percent by weight based on the weight of the polyethylene terephthalate.

9. The method of claim 8, wherein said chain extending agent is present in an amount of about 1 to about 5 percent based on the weight of the polyethylene terephthalate.

* * * * *